United States Patent
Kijlstra et al.

(10) Patent No.: US 8,133,932 B2
(45) Date of Patent: Mar. 13, 2012

(54) METHOD FOR PRODUCING METAL PARTICLES, METAL PARTICLES PRODUCED THEREBY, AND THE USE THEREOF

(75) Inventors: Johan Kijlstra, Odenthal (DE); Peter H. Weuta, Leverkusen (DE); Dirk Storch, Köln (DE); Daniel Duff, Leverkusen (DE); Werner Hoheisel, Köln (DE)

(73) Assignee: Bayer Technology Service GmbH, Leverkusen (DE)

( * ) Notice: Subject to any disclaimer, the term of this patent is extended or adjusted under 35 U.S.C. 154(b) by 587 days.

(21) Appl. No.: 12/297,065

(22) PCT Filed: Apr. 12, 2007

(86) PCT No.: PCT/EP2007/003258
§ 371 (c)(1),
(2), (4) Date: Nov. 17, 2008

(87) PCT Pub. No.: WO2007/118669
PCT Pub. Date: Oct. 25, 2007

(65) Prior Publication Data
US 2009/0263496 A1  Oct. 22, 2009

(30) Foreign Application Priority Data
Apr. 15, 2006 (DE) .......................... 10 2006 017 696

(51) Int. Cl.
*A61K 33/24* (2006.01)
*C04B 14/02* (2006.01)
*C09C 1/10* (2006.01)
*C09C 1/22* (2006.01)
*C09C 1/04* (2006.01)
*C09D 11/02* (2006.01)
*H01B 1/02* (2006.01)
*B01J 23/00* (2006.01)
*G01N 33/00* (2006.01)

(52) U.S. Cl. ..... 523/122; 502/300; 424/600; 252/408.1; 252/512; 106/1.05; 106/400; 106/419; 106/452; 106/456; 106/480

(58) Field of Classification Search .................. 523/122; 106/1.05, 400, 419, 452, 456, 480; 252/408.1, 252/512; 424/600; 502/300
See application file for complete search history.

(56) References Cited

U.S. PATENT DOCUMENTS

| 2,806,798 A | 9/1957 | Clay |
| 2,902,400 A | 9/1959 | Moudry et al. |
| 3,201,223 A | 8/1965 | Bohuslav et al. |
| 3,615,789 A | 10/1971 | Schaller |
| 4,652,311 A | 3/1987 | Gulla et al. |
| 2005/0223847 A1 * | 10/2005 | Shiraishi et al. ................ 75/348 |

FOREIGN PATENT DOCUMENTS

| EP | 1 084 746 A | 3/2001 |
| EP | 1 493 780 | 1/2005 |

* cited by examiner

*Primary Examiner* — Kriellion Sanders
(74) *Attorney, Agent, or Firm* — Norris McLaughlin & Marcus PA

(57) ABSTRACT

Process for producing metal particle sols having a metal particle content of $\geq 1$ g/l, comprising the steps of
a) reacting a metal salt solution with a solution containing hydroxide ions
b) reacting the solution obtained from step a) with a reducing agent,
wherein at least one of the solutions in step a) comprises a dispersing assistant, metal particles produced by the process and the use thereof.

8 Claims, 2 Drawing Sheets

US 8,133,932 B2

METHOD FOR PRODUCING METAL PARTICLES, METAL PARTICLES PRODUCED THEREBY, AND THE USE THEREOF

This is a 371 of PCT/EP2007/003258 filed 12 Apr. 2007, which claims foreign priority benefit under 35 U.S.C. §119 of the German Patent Application No. 10 2006 017 696.0 filed 15 Apr. 2006.

The present invention relates to a process for producing metal particle sols with a metal particle content of $\geq 1$ g/l, comprising the steps of reacting a metal salt solution with a solution containing hydroxide ions and reacting the solution obtained from the preceding step with a reducing agent. The present invention further relates to metal particles which have been produced by the process according to the invention and to the use of such metal particles.

BACKGROUND OF THE INVENTION

Metal particles in the context of the present invention include nanoparticles and submicroparticles. Nanoparticles in the context of the present invention are defined as particles which are smaller than 100 nm at least in one dimension. Microparticles are considered to be particles which are between 1 μm and 1000 μm in size in all three dimensions. Submicroparticles are defined as particles which are larger than 100 nm in all three dimensions and which are smaller than 1 μm in at least one dimension. A sol or colloid is a dispersion of nano- or submicroparticles in a liquid.

Important criteria for the properties and fields of use of nanoscale and submicroscale metal particles include the particle morphology, the mean particle size, the particle size distribution, the stability of the dispersions in terms of colloid chemistry, and the processing properties of the particles.

Metal colloids can be characterized with regard to particular properties using their UV/Vis spectra. For instance, they exhibit a so-called plasmon peak, which originates from a collective oscillation of conduction electrons as a reaction to an oscillating external electromagnetic field. The shape and size of the plasmon peak can be characterized by the $E_{m+100}/E_m$ ratio where $E_m$ corresponds to the absorbance maximum of a plasmon peak and $E_{m+100}$ to the absorbance of the metal sol in the UV/Vis spectrum at the absorbance maximum plus 100 nm. For silver nanoparticles, it has become an established convention to use the $E_{500}/E_m$ ratio, i.e. to form the ratio of the absorbance at 500 nm and at the peak maximum. This is valid since an absorbance maximum between 400 and 420 nm can be assumed for silver nanoparticles. The shape and size of the plasmon peak can then be used to draw conclusions about the particle size and the particle size distribution of the sample. In addition, the UV/Vis spectrum also changes when the sample agglomerates: the plasmon peak decreases in intensity and broadens.

The prior art discloses various processes for producing metallic nanoparticles. A known principle is the direct chemical reduction of dissolved metal ions in the liquid phase. The aim of many variants of this method is the production of dispersions, stable in terms of colloid chemistry, of metallic nanoparticles with narrow particle size distribution and defined surface properties. The different variants are characterized by the selection of the reactants, the reaction conditions and the reaction regime. The production of metallic nanoparticles by this principle is generally carried out as a batch process. However, it has not been possible to date to synthesize such dispersions with a metal particle content of 1 g/l or higher without needing to perform a subsequent concentration step.

In this context, the expression "stable in terms of colloid chemistry" means that the properties of the colloidal dispersion or of the colloids themselves do not change significantly during the customary storage times before application, for example no significant aggregation or flocculation of the colloid particles takes place.

One possible further route to the production of nanoscale metal particles is the synthesis of nanoscale metal oxide particles which are reduced in a subsequent step.

The synthesis of silver oxide nanoparticles and their conversion to metallic silver is discussed, for example, in EP 1 493 780 A1. This document discloses a conductive composition which is capable of providing a conductive dye with excellent flexibility and a high conductivity comparable to that of metallic silver, without high temperatures being required for film formation.

The conductive composition comprises a particulate silver compound and a binder, and optionally a reducing agent and a binder. Silver oxide, silver carbonate, silver acetate and the like are used as the particulate silver compound. Ethylene glycol, diethylene glycol, ethylene glycol diacetate and the like are used as reducing agents. A fine powder or a thermally curing resin, such as a polyvalent phenol compound, phenol resin, alkyd resin or polyester resin, or a thermoplastic resin such as styrene resin or polyethylene terephthalate having an average particle diameter of 20 nm to 5 μm, is used as the binder.

Moreover, the average particle diameter of the particulate silver compound is preferably 0.01 to 10 μm.

EP 1 493 780 A1, however, does not disclose how concentrated dispersions of silver nanoparticles can be prepared. Instead, the particulate silver compound is reduced at temperatures of more than 150° C. in the binder to silver particles which fuse with one another.

Methods for producing concentrated nanoscale metal oxide dispersions and the further use thereof in the production of nanoscale metal particles have thus not been disclosed to date. There therefore still exists in the prior art the need for a process for producing concentrated metal particle nanosols, for example from concentrated nanoscale metal oxide dispersions.

The present invention has for its object to overcome at least one of the disadvantages mentioned in the prior art. More particularly, it has for its object to provide a process for producing metal particle sols with a metal particle content of $\geq 1$ g/l.

SUMMARY OF THE INVENTION

The object of the invention is achieved by a process for producing metal particle sols having a metal particle content of $\geq 1$ g/l, comprising the steps of
a) reacting a metal salt solution with a solution containing hydroxide ions
b) reacting the solution obtained from step a) with a reducing agent,
wherein at least one of the solutions in step a) comprises a dispersing assistant.

Without being bound to a particular theory, it is assumed that, in step a) of the process according to the invention, the metal cations present in the metal salt solution react with the hydroxide ions of the solution containing hydroxide ions, precipitating out of the solution as metal oxides, metal hydroxides, mixed metal oxide hydroxides and/or hydrates thereof. This process can be referred to as a heterogeneous precipitation of nanoscale and submicroscale particles.

In the second step, b), of the process according to the invention, the solution which comprises the metal oxide/hydroxide particles is reacted with a reducing agent. In this step, a conversion takes place in the solid phase.

The distinguishing feature of the process according to the invention is that the heterogeneous precipitation of the nanoscale and submicroscale particles takes place in the presence of a dispersing assistant, also known as a protective colloid.

DETAILED DESCRIPTION

The process according to the invention offers several advantages over the prior art. For instance, it is now possible to produce dispersions of metal nanoparticles which have high solids concentrations without having to concentrate. In the case of silver nanoparticles, for example, solids contents of $\geq 1$ g/l to $\leq 15.0$ g/l can be achieved. If, though, a concentration for which the dispersions produced by the process according to the invention are also suitable should be selected, $\leq 97.0$ g/l or even higher solids contents can be achieved.

In addition to the high solids contents of the metal nanosol, a further advantage is that the particles can be produced with a narrow particle size distribution. For instance, it is possible to prepare silver nanosols whose UV/Vis spectra have an $E_{500}/E_m$ ratio of $\geq 0.01$ to $\leq 0.8$, of $\geq 0.1$ to $\leq 0.35$ and of $\geq 0.15$ to $\leq 0.25$.

In addition, the metal nanosols produced in accordance with the invention are notable for a high stability in terms of colloid chemistry, which is maintained in the case of an optional concentration.

The process according to the invention allows the particle size distribution of the metal particles to be adjusted precisely by means of controlling the heterogeneous precipitation step and the reduction step to produce sols having a narrow particle size distribution.

Moreover, it is possible by means of the process according to the invention to provide metal nanosols which are stable over a wide pH range, for example of pH$\geq 2$ to pH$\leq 12$.

It is preferred that the metal particle sols or the metal particles produced in accordance with the invention are not agglomerated in the sols. In the context of the present invention, "not agglomerated" means that, in the UV/Vis spectra of the metal particle sols, the plasmon peak has an $E_{m+100}/E_m$ ratio of $\geq 0.001$ to $\leq 0.8$, preferably of $\geq 0.01$ to $\leq 0.75$ and more preferably of $\geq 0.02$ to $\leq 0.7$. In the case of silver particles, the same statement can be made for the $E_{500}/E_m$ ratio.

A suitable solvent for the process according to the invention is water. However, other solvents are also conceivable, for example when the process is to be performed at temperatures below 0° C. or above 100° C., or the resulting product is to be incorporated into matrices in which the presence of water would be troublesome. For example, it is possible to use polar-protic solvents such as alcohols and acetone, polar-aprotic solvents such as N,N-dimethylformamide (DMF), or nonpolar solvents such as $CH_2Cl_2$. Mixtures of the aforementioned solvents and solvent groups are also suitable.

If appropriate, it is also possible to add further substances, such as low molecular weight additives, salts, extraneous ions, surfactants and complexing agents, to the reactant solutions, which is also understood to mean the solution of the reducing agent in step b), or the solution obtained after step a). In addition, the reactant solutions can be degassed before the reaction in order, for example, to remove oxygen and $CO_2$. It is likewise possible that the reactant solutions are handled under protective gas and/or in the dark.

Acids or bases can be added to the solution obtained after step a) to establish a desired pH. It is advantageous, for example, to keep the pH in the acidic range. This allows the monodispersity of the particle distribution in the subsequent step b) to be improved.

Appropriately, a molar ratio between the amount of hydroxide ions and the amount of metal cations of $\geq 0.5:1$ to $\leq 10:1$, preferably $\geq 0.7:1$ to $\leq 5:1$, more preferably $\geq 0.9:1$ to $\leq 2:1$, is selected.

The temperature at which process step a) is performed may, for example, be within a range of $\geq 0°$ C. to $\leq 100°$ C., preferably $\geq 5°$ C. to $\leq 50°$ C., more preferably $\geq 10°$ C. to $\leq 30°$ C.

Appropriately, in the reduction step b), an excess of the equivalents of the reducing agent of $\geq 1:1$ to $\leq 100:1$, preferably $\geq 2:1$ to $\leq 25:1$, more preferably $\geq 4:1$ to $\leq 5:1$, is selected.

The temperature at which process step b) is performed may, for example, be within a range of $\geq 0°$ C. to $\leq 100°$ C., preferably $\geq 30°$ C. to $\leq 95°$ C., more preferably $\geq 55°$ C. to $\leq 90°$ C.

To remove accompanying substances and/or salts which are dissolved in the product dispersion, i.e. in the metal particle dispersion, and to concentrate the dispersion, the common methods of mechanical liquid removal (for example filtration on a pressure filter or in a centrifugal field, sedimentation under a gravitational or centrifugal field), of extraction, of membrane technology (dialysis) and of distillation can be used.

It is also possible that the product dispersion is concentrated by means of standard methods (ultrafiltration, centrifugation, sedimentation—possibly after addition of flocculating assistants or poor solvents—dialysis and evaporative concentration) and optionally washed.

By means of a washing step or by addition of additives, it is optionally possible to further optimize the stability in terms of colloid chemistry and the performance properties of the product dispersion.

As a result of the use of a dispersing assistant, the metal particle nanosols and their oxidic precursor phases have a high stability in terms of colloid chemistry. This is shown, inter alia, by the fact that the colloidal properties of the sols produced by the process according to the invention are maintained even in the case of a subsequent concentration. It is even possible to remove the solvent and then to redisperse the particles without losing their colloidal properties.

It is envisaged that the dispersing assistant has a molecular weight, in the case of polymers expressed as the weight average $M_w$, between $\geq 100$ g/mol and $\leq 1\,000\,000$ g/mol and preferably between $\geq 1000$ g/mol and $\leq 100\,000$ g/mol.

The selection of the dispersing assistant also allows the surface properties of the particles to be adjusted. Dispersing assistant adhering on the particle surface can, for example, impart a positive or negative surface charge to the particles.

In one embodiment of the present invention, the dispersing assistant is selected from the group comprising alkoxylates, alkylolamides, esters, amine oxides, alkylpolyglucosides, alkylphenols, arylalkylphenols, water-soluble homopolymers, random copolymers, block copolymers, graft polymers, polyethylene oxides, polyvinyl alcohols, copolymers of polyvinyl alcohols and polyvinyl acetates, polyvinylpyrrolidones, cellulose, starch, gelatin, gelatin derivatives, amino acid polymers, polylysine, polyaspartic acid, polyacrylates, polyethylenesulphonates, polystyrenesulphonates, polymethacrylates, condensation products of aromatic sulphonic acids with formaldehyde, naphthalenesulphonates, lignosulphonates, copolymers of acrylic monomers, polyethyleneimines, polyvinylamines, polyallylamines, poly(2-vinylpyridines) and/or polydiallyldimethylammonium chloride.

Such dispersing assistants can firstly influence the particle size and the particle size distribution of the metal nanosols. For some applications, it is important that a narrow particle size distribution is present. For other applications, it is advantageous when a broad or multimodal particle size distribution is present since the particles can assume a tighter packing. A further advantage of these dispersing assistants is that they can impart controlled properties to the particles on whose surfaces they adhere. In addition to the positive and negative surface charges already mentioned, which can also contribute to the colloidal stability as a result of the mutual repulsion, mention should also be made of the hydrophilicity or hydrophobicity of the surface and the biocompatibility. Hydrophilicity and hydrophobicity of the nanoparticles are, for example, important when the particles are to be dispersed in a particular medium, for example in polymers. The biocompatibility of the surfaces allows the use of the nanoparticles in medical applications.

In a further embodiment of the present invention, the dispersing assistant is present in at least one reactant solution in a concentration of $\geq 0.1$ g/l to $\leq 100$ g/l, preferably $\geq 1$ g/l to $\leq 60$ g/l, more preferably $\geq 5$ g/l to $\leq 40$ g/l. If both solutions in step a) of the process according to the invention comprise the dispersing assistant, it is possible that the dispersing assistants are different and are present in different concentrations.

The selection of such a concentration range ensures firstly that the particles, when precipitated from the solution, are covered with dispersing assistant to such an extent that the desired properties such as stability and redispersibility are maintained. Secondly, excessive enveloping of the particles with the dispersing assistant is prevented. An unnecessary excess of dispersing assistant might also react undesirably with the reducing agent. Furthermore, an excess of dispersing assistant is disadvantageous for the colloidal stability of the particles and hinders further processing. The selection not least allows processing of liquids with viscosity which is easy to handle in terms of process technology.

In a further embodiment of the present invention, the metal salt solution comprises ions which are selected from the group comprising iron, ruthenium, osmium, cobalt, rhodium, iridium, nickel, palladium, platinum, copper, silver, gold, zinc and/or cadmium. These metals precipitate out of basic solution reliably as oxides/hydroxides and, in reduced form, are stable with respect to oxidation by atmospheric oxygen. Furthermore, they conduct electrical current readily and have desired catalytic properties which can be enhanced further by virtue of the large surface area. Silver and gold are also biocompatible. Especially silver also has antimicrobial properties.

Suitable counterions to the metal cations are, for example, nitrate, chloride, bromide, sulphate, carbonate, acetate, tetrafluoroborate or tetraphenylborate.

In a further embodiment of the present invention, the metal ions are present in the metal salt solution in a concentration of $\geq 0.001$ mol/l to $\leq 2$ mol/l, preferably $\geq 0.01$ mol/l to $\leq 1$ mol/l, more preferably $\geq 0.1$ mol/l to $\leq 0.5$ mol/l. This concentration range is advantageous since the solids content of the nanosol achieved at lower concentrations would be too low and costly aftertreatment steps would be necessary. At higher concentrations, the precipitation of the oxide/hydroxide particles would proceed too quickly, which would have the consequence of an inhomogeneous particle morphology. Furthermore, the particles would aggregate further as a result of the high concentration.

In a further embodiment of the present invention, the solution comprising hydroxide ions is obtainable from the reaction of bases selected from the group consisting of LiOH, NaOH, KOH, $Mg(OH)_2$, $Ca(OH)_2$, aliphatic amines, aromatic amines, alkali metal amides and/or alkoxides. Such bases have the advantage that they can be obtained inexpensively and are easy to dispose of in the case of later wastewater treatment of the solutions from the process according to the invention.

The concentration of the hydroxide ions in the solution containing hydroxide ions may appropriately be within a range of $\geq 0.001$ mol/l to $\leq 2$ mol/l, preferably $\geq 0.01$ mol/l to $\leq 1$ mol/l, more preferably $\geq 0.1$ mol/l to $\leq 0.5$ mol/l.

In a further embodiment of the present invention, the reducing agent is selected from the group consisting of polyalcohols, aminophenols, amino alcohols, aldehydes, sugars, tartaric acid, citric acid, ascorbic acid and salts thereof, triethanolamine, hydroquinone, sodium dithionite, hydroxymethanesulphinic acid, sodium disulphite, formamidinesulphinic acid, sulphurous acid, hydrazine, hydroxylamine, ethylenediamine, tetramethylethylenediamine, hydroxylamine sulphate, sodium borohydride, formaldehyde, alcohols, ethanol, n-propanol, iso-propanol, n-butanol, iso-butanol, sec-butanol, ethylene glycol, ethylene glycol diacetate, glycerol and/or dimethylaminoethanol.

In principle, it is also conceivable that the metal oxide/hydroxide particles can be reduced by an electrochemical route by means of anode and cathode. However, the reducing agents mentioned are preferable since they can be used without any further apparatus complexity and are easy to dispose of in the case of later wastewater treatment of the solutions from the process according to the invention.

In a particular embodiment of the present invention, at least steps a) and/or b) are carried out in continuous operating mode. Suitable reactor types for a continuous operating mode are, for example, continuous stirred tanks or cascades thereof, or flow tubes and microreactors.

In a further embodiment of the present invention, at least steps a) and/or b) are carried out in a microreactor. "Microreactor" in the context of the present invention refers to miniaturized, preferably continuous reactors which are known, among other names, as "microreactors", "minireactors", "micromixers" or "minimixers". Examples are T and Y mixers, and also the micromixers from a wide variety of different companies (e.g. Ehrfeld Mikrotechnik BTS GmbH, Institut für Mikrotechnik Mainz GmbH, Siemens AG, CPC Cellular Process Chemistry Systems GmbH).

Microreactors are advantageous since use of mixing units is required in the continuous production of micro- and nanoparticles by means of wet chemical and heterogeneous precipitation processes. The mixing units used may be the above-mentioned microreactors and dispersing nozzles or jet reactors. Examples of jet reactors are the microjet reactor (Synthesechemie GmbH) and the jet disperser (Bayer Technology Services GmbH). Compared to batch processes, continuous processes have the advantage that the scale-up from the laboratory scale to the production scale is simplified by the "numbering up" principle instead of the "scaling up" principle.

It is a further advantage of the process according to the invention that, owing to the readily controllable product properties, performance in a microreactor is possible without it becoming blocked in continuous operation.

It is preferred to perform the heterogeneous precipitation process to prepare the metal oxide/hydroxide particles as a microprocess in a capillary system comprising a first delay zone, a second delay zone, a microreactor, a third delay zone and a pressure valve. Particular preference is given to pumping the reactant solutions, i.e. the solution containing metal salt solution and the hydroxide ions, by means of pumps or high-pressure pumps, for example HPLC pumps, through the system or the capillary system with a constant flow rate. The pressure valve downstream of a cooler is used to decompress the liquid and collect it in a product vessel via a discharge capillary.

The microreactor is appropriately a mixer with a mixing time of $\geq 0.01$ s to $\leq 10$ s, preferably $\geq 0.05$ s to $\leq 5$ s, more preferably $\geq 0.1$ s to $\leq 0.5$ s.

Suitable delay zones are capillaries with a diameter of $\geq 0.05$ mm to $\leq 20$ mm, preferably $\geq 0.1$ mm to $\leq 10$ mm, more preferably $\geq 0.5$ mm to $\leq 5$ mm.

The length of the delay zones is appropriately between $\geq 0.05$ m and $\leq 10$ m, preferably $\geq 0.08$ m to $\leq 5$ m, more preferably $\geq 0.1$ m to $\leq 0.5$ m.

The temperature of the reaction mixture in the system is appropriately between $\geq 0°$ C. and $\leq 100°$ C., preferably $\geq 5°$ C. to $\leq 50°$ C., more preferably $\geq 3°$ C. to $\leq 30°$ C.

The flow rates of the reactant streams per microreactor unit are appropriately between $\geq 0.05$ ml/min and $\leq 5000$ ml/min, preferably $\geq 0.1$ ml/min to $\leq 250$ ml/min, more preferably $\geq 1$ ml/min to $\leq 100$ ml/min.

The invention further relates to metal particles which are producible by a process according to the invention. These metal particles may have, for example, with regard to their particle sizes, $d_{50}$ values of $\geq 0.01$ μm to $\leq 0.5$ μm, preferably $\geq 0.02$ μm to $\leq 0.4$ μm, more preferably $\geq 0.03$ μm to $\leq 0.3$ μm. The shape of the plasmon peak measured in the UV/Vis spectrum, $E_{m+100}/E_m$, may assume values of $\geq 0.01$ to $\leq 0.8$, preferably $\geq 0.1$ to $\leq 0.35$, more preferably $\geq 0.15$ to $\leq 0.25$. In the case of silver particles, the same statement can be made for the $E_{500}/E_m$ ratio.

The invention likewise relates to the use of metal particles which have been produced by a process according to the invention for producing catalysts, coating materials, functional layers, transparent conductive layers, metallurgic products, electronic products, electroceramics, optical materials, biolabels, inks for inkjet printing and screen printing, conductive microstructures, materials for forgeryproof marking, polymer composites, antimicrobial materials and/or active ingredient formulations.

Figure 1:
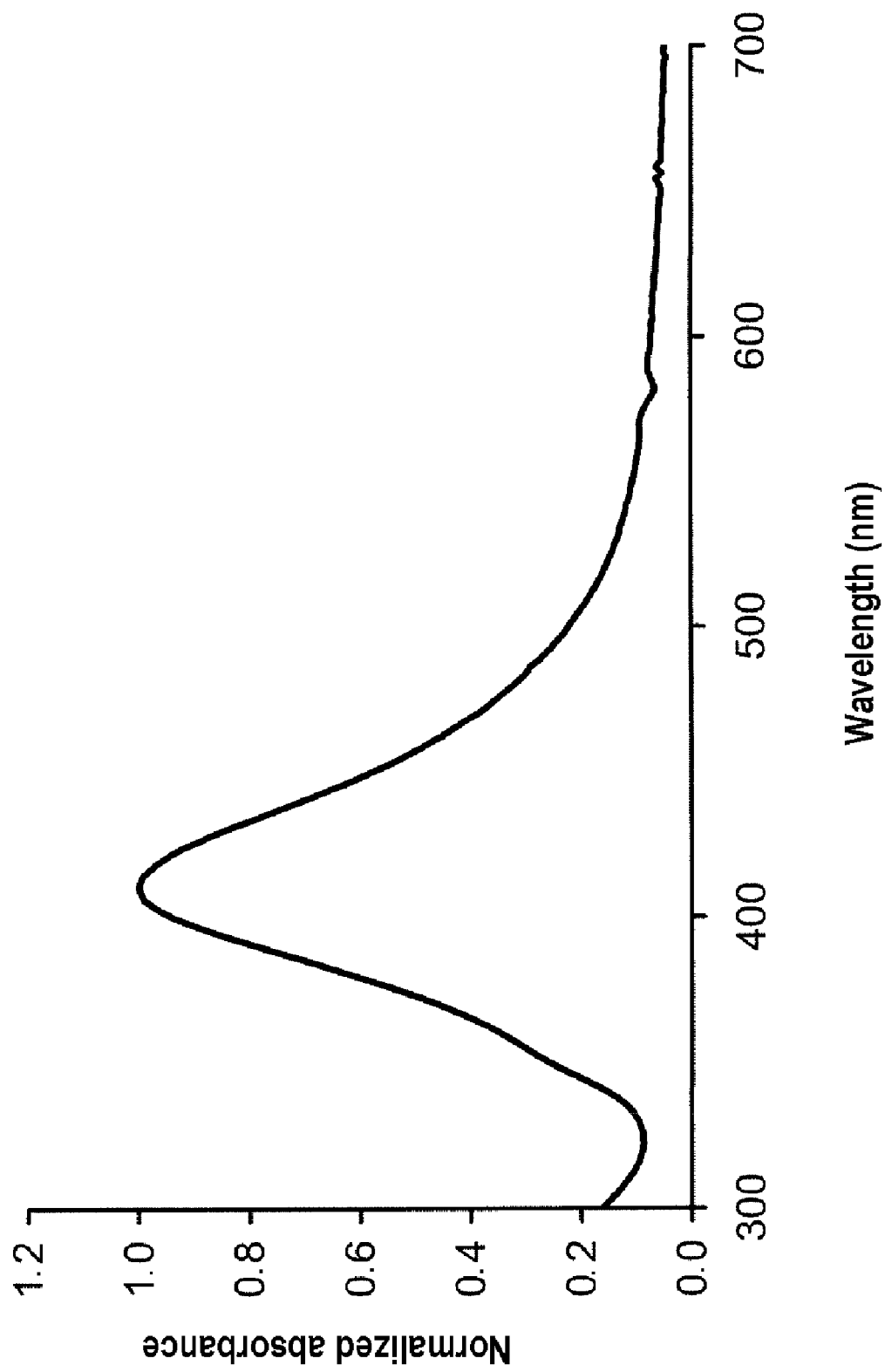
FIG. 1 shows a UV/Vis spectrum of a silver nanosol from Example 2. The absorbance is plotted as the normalized absorbance $E_\lambda/E_{max}$ against the wavelength $\lambda$. A marked plasmon peak with $E_{500}/E_m=0.22$ is discernible. A peak maximum occurs at 412 nm.

The present invention is illustrated further hereinafter by Examples 1 to 11.

For particle characterization, the particle size, the particle size distribution and the particle morphology are characterized by means of transmission electron microscopy (TEM, Philips CM 20), dynamic light scattering (hydrodynamic particle size, Brookhaven BIC-90 Plus) and UV/Vis spectroscopy (Hewlett Packard Diode Array Spectrophotometer 8452 A). In UV/Vis spectroscopy, the result is shown as the normalized absorbance as a function of wavelength. The normalized absorbance at wavelength $\lambda$ corresponds to $E_\lambda/E_{max}$.

EXAMPLE 1

Production of $Ag_2O$ Nuclei in a Batch Process

A 54 millimolar solution of silver nitrate (9.17 g/l of $AgNO_3$) as reactant 1 and a 54 millimolar solution of NaOH (2.14 g/l) with a dispersing assistant concentration of 10 g/l as reactant 2 were made up. The solvent used was demineralized water (prepared with Milli-Qplus, QPAK®2, Millipore Corporation). The dispersing assistant used was PVP K15 polyvinylpyrrolidone (Fluka Chemie GmbH). A glass beaker was initially charged at room temperature with 250 ml of reactant 1. While continuously stirring, 250 ml of reactant 2 were metered homogeneously into the reaction solution over a duration of 10 s. The equivalents ratio of the base to the silver salt in the reactant mixture is thus 1.0. The mixture was then stirred for another 10 min. This afforded a grey-black $Ag_2O$ nanosol stable in terms of colloid chemistry.

EXAMPLE 2

Reduction of the $Ag_2O$ Nuclei to Metallic Silver Particles in a Batch Process

The 500 ml of the $Ag_2O$ nanosol produced in Example 1 were admixed while continuously stirring at room temperature with 25 ml of a 2.33 molar aqueous formaldehyde solution (70 g/l), stored at 60° C. for 30 min and cooled. This afforded a sol which was stable in terms of colloid chemistry and comprised metallic silver nanoparticles. Subsequently, the particles were isolated by means of centrifugation (60 min at 30 000 rpm, Avanti J 30i, Rotor JA 30.50, Beckman Coulter GmbH) and redispersed in demineralized water by introducing ultrasound (Branson Digital Sonifier). An Ag nanosol which was stable in terms of colloid chemistry and had a solids content of 0.92% by weight and a pH of 7.4 was obtained.

The examination of the particle size by means of electron microscopy showed particles with a diameter between 10 and 50 nm.

The examination of the particle size by means of dynamic light scattering showed crystalline Ag particles with an effective hydrodynamic diameter of 46 nm.

The silver nanosol was examined by means of UV/Vis spectroscopy. The spectrum is shown in FIG. 1. The examination showed a marked and relatively narrow plasmon peak with $E_{500}/E_m=0.22$. The peak maximum occurs at 412 nm.

EXAMPLE 3

Production and Reduction of $Ag_2O$ Nuclei to Silver Nanoparticles Analogously to Examples 1 and 2

A 300 millimolar aqueous solution of silver nitrate (51.0 g/l of $AgNO_3$) as reactant 1 and a 300 millimolar aqueous solution of NaOH (12.0 g/l) with a dispersing assistant concentration of 40 g/l as reactant 2 were made up. The dispersing assistant used was PVP K15 polyvinylpyrrolidone (Fluka Chemie GmbH). The washing process of the particles (by means of centrifugation and redispersion in demineralized water) analogous to Example 2 was carried out once.

The silver sol which had been washed once was studied by means of UV/Vis spectroscopy. The examination showed a marked and relatively narrow plasmon peak with $E_{500}/E_m=0.22$. The peak maximum occurs at 400 nm.

Subsequently, analogously to Example 2, the silver sol was washed twice more. An Ag nanosol which was stable in terms of colloid chemistry and had a solids content of 9.7% by weight was obtained.

The examination of the particle size of this nanosol by means of dynamic light scattering showed particles with an effective hydrodynamic diameter of 78 nm.

The UV/Vis examination showed a marked and relatively narrow plasmon peak with $E_{500}/E_m=0.09$. The peak maximum occurs again at 400 nm.

EXAMPLE 4

Production and Reduction of $Ag_2O$ Nuclei to Silver Nanoparticles Analogously to Examples 1 and 2

A 54 millimolar aqueous solution of silver nitrate (9.17 g/l of $AgNO_3$) as reactant 1 and a 54 millimolar aqueous solution of NaOH (2.14 g/l) with a dispersing assistant concentration of 10 g/l as reactant 2 were made up. The dispersing assistant used was PVP K90 polyvinylpyrrolidone (Fluka Chemie GmbH). Analogously to Examples 1 and 2, an Ag nanosol which was stable in terms of colloid chemistry and had a solids content of 1.5% by weight was obtained.

The examination of the particle size by means of dynamic light scattering showed particles with an effective hydrodynamic diameter of 135 nm.

The silver nanosol was examined by means of UV/Vis spectroscopy. The examination showed a marked and relatively narrow plasmon peak with $E_{500}/E_m=0.24$. The peak maximum occurs at 422 nm.

EXAMPLE 5

Production and Reduction of $Ag_2O$ Nuclei to Silver Nanoparticles Analogously to Examples 1 and 2

A 54 millimolar aqueous solution of silver nitrate (9.17 g/l of $AgNO_3$) as reactant 1 and a 54 millimolar aqueous solution of NaOH (2.14 g/l) with a dispersing assistant concentration of 10 g/l as reactant 2 were made up. The dispersing assistant used was Baypure DS 100 solid (Lanxess). Analogously to Example 1, an Ag nanosol which was stable in terms of colloid chemistry and had a solids content of 0.9% by weight was obtained.

The examination of the particle size by means of dynamic light scattering showed particles with an effective hydrodynamic diameter of 62 nm.

The UV/Vis examination showed a marked and relatively narrow plasmon peak with $E_{500}/E_m=0.67$. The peak maximum occurs at 420 nm.

EXAMPLE 6

Production and Reduction of $Ag_2O$ Nuclei to Silver Nanoparticles Analogously to Examples 1 and 2

A 54 millimolar aqueous solution of silver nitrate (9.17 g/l of $AgNO_3$) as reactant 1 and a 54 millimolar aqueous solution of NaOH (2.14 g/l) with a dispersing assistant concentration of 10 g/l as reactant 2 were made up. The dispersing assistant used was Tamol NH 7519 (BASF AG). Analogously to Example 1, an Ag nanosol which was stable in terms of colloid chemistry and had a solids content of 1.2% by weight was obtained.

The examination of the particle size by means of dynamic light scattering showed particles with an effective hydrodynamic diameter of 65 nm.

The UV/Vis examination showed a marked and relatively narrow plasmon peak with $E_{500}/E_m=0.67$. The peak maximum occurs at 420 nm.

EXAMPLE 7

Production and Reduction of $Ag_2O$ Nuclei to Silver Nanoparticles Analogously to Examples 1 and 2

A 54 millimolar aqueous solution of silver nitrate (9.17 g/l of $AgNO_3$) as reactant 1 and a 54 millimolar aqueous solution of NaOH (2.14 g/l) with a dispersing assistant concentration of 10 g/l as reactant 2 were made up. The dispersing assistant used was PVP K15 polyvinylpyrrolidone (Fluka Chemie GmbH). Analogously to Example 1, the $Ag_2O$ nuclei were produced.

While continuously stirring, 500 ml of the $Ag_2O$ nanosol were admixed at room temperature with 25 ml of a 5.43 molar aqueous glycerol solution (500 g/l), stored at 60° C. for 30 min and cooled. This afforded an Ag nanosol which was stable in terms of colloid chemistry and had a solids content of 0.7% by weight.

The examination of the particle size by means of dynamic light scattering showed particles with an effective hydrodynamic diameter of 78 nm.

The silver nanosol was examined by means of UV/Vis spectroscopy. The examination showed a marked plasmon peak with $E_{500}/E_m=0.35$. The peak maximum occurs at 402 nm.

EXAMPLE 8

$Ag_2O$ Nuclei were Produced Continuously in a Microreactor

The feed capillaries, i.e. first delay zone and second delay zone, to the mixer and the third delay zone (downstream of the mixer) comprise capillary tubes with an internal diameter of 2.25 mm. The first, second and third delay zones have a length of 30 cm each. The mixer used was a multilamellar mixer (comb mixer, Ehrfeld Mikrotechnik BTS GmbH). The temperatures of the first, second and third delay zones and of the mixer were controlled by immersion into a water bath at 10° C.

A 54 millimolar solution of silver nitrate (9.17 g/l of $AgNO_3$) as reactant 1 and a 54 millimolar solution of NaOH (2.14 g/l) with a dispersing assistant concentration of 10 g/l as reactant 2 were made up. The solvent used was demineralized water (prepared with Milli-Qplus, QPAK®2, Millipore Corporation). The dispersing assistant used was PVP K15 polyvinylpyrrolidone (Fluka Chemie GmbH).

High-pressure HPLC pumps with pressure sensors (Shimadzu LC-7 A) were used to pump both reactants from reactant vessels at room temperature through the system at a constant flow rate of in each case 3 ml/min. The pressure in the system was adjusted to 20 bar by regulation of the pressure valve (R3A relief valve, Nupro Company).

This afforded a grey-black $Ag_2O$ nanosol which was stable in terms of colloid chemistry and had no significant sedimentation.

EXAMPLE 9

Reduction of Ag$_2$O Nuclei from Example 8 to Metallic Silver Nanoparticles

While continuously stirring, 200 ml of the Ag$_2$O nanosol produced in Example 8 were admixed at room temperature with 50 ml of a 2.33 molar aqueous formaldehyde solution (70 g/l), stored at 60° C. for 30 min and cooled. This afforded a sol which comprised metallic silver nanoparticles and was prepared by means of dialysis (ZelluTrans Roth dialysis tube 25.0 V, Carl Roth GmbH & Co.) against demineralized water. An Ag nanosol which was stable in terms of colloid chemistry and had a solids content of 0.21% by weight and a conductivity of less than 5 μS/cm was obtained.

The examination of the particle size by means of electron microscopy showed crystalline Ag particles having a diameter of below 10 nm.

The silver nanosol was examined by means of UV/Vis spectroscopy. The examination showed a marked plasmon peak with $E_{500}/E_m$=0.05. The peak maximum occurs at 406 nm.

EXAMPLE 10

Reduction of the Ag$_2$O Nuclei to Metallic Silver Particles in a Batch Process in the Presence of Fe(II) SO$_4$ The 500 ml of the Ag$_2$O nanosol produced in Example 1 were admixed while continuously stirring with 50 ml of a 1.0 millimolar aqueous and oxygen-free solution of Fe(II) SO$_4$ and then with 25 ml of a 2.33 molar aqueous formaldehyde solution (70 g/l), stored at 60° C. for 30 min and cooled. This afforded a sol which was stable in terms of colloid chemistry and comprised metallic silver nanoparticles. The washing process of the particles (by means of centrifugation and redispersion in demineralized water) analogously to Example 2 was carried out three times. An Ag nanosol which was stable in terms of colloid chemistry and had a pH of 7.7 was obtained.

The examination of the particle size by means of electron microscopy showed particles having a diameter between 15 and 60 nm with a significantly reduced fines fraction compared to the sample without Fe(II) SO$_4$ from Example 2.

The examination of the particle size by means of electron microscopy showed crystalline Ag particles with an effective hydrodynamic diameter of 84 nm.

The silver nanosol was examined by means of UV/Vis spectroscopy. The examination showed a marked plasmon peak with $E_{500}/E_m$=0.35. The peak maximum occurs at 414 nm.

EXAMPLE 11

Reduction of the Ag$_2$O Nuclei to Metallic Silver Nanoparticles in a Batch Process at a pH of 3

The 500 ml of the Ag$_2$O nanosol produced in Example 1 were adjusted while continuously stirring to a pH of 3.0 with a 0.1 molar nitric acid solution. Subsequently, the sol was admixed while continuously stirring with 25 ml of a 2.33 molar aqueous formaldehyde solution (70 g/l), stored at 60° C. for 30 min and cooled. This afforded a sol which was stable in terms of colloid chemistry and comprised metallic silver nanoparticles. The washing process of the particles (by means of centrifugation and redispersion in demineralized water) analogously to Example 2 was carried out once. An Ag nanosol which was stable in terms of colloid chemistry and had a pH of 4.1 was obtained.

The examination of the particle size by means of electron microscopy showed crystalline Ag particles having a diameter between 15 and 30 nm.

The examination of the particle size by means of dynamic light scattering showed particles having an effective hydrodynamic diameter of 34 nm.

The silver nanosol was examined by means of UV/Vis spectroscopy. The examination showed a marked plasmon peak with $E_{500}/E_m$=0.12. The peak maximum occurs at 414 nm.

EXAMPLE 12

Continuous Production and Reduction of Ag$_2$O Nuclei to Silver Nanoparticles Analogously to Example 1 and 2

Figure 2:
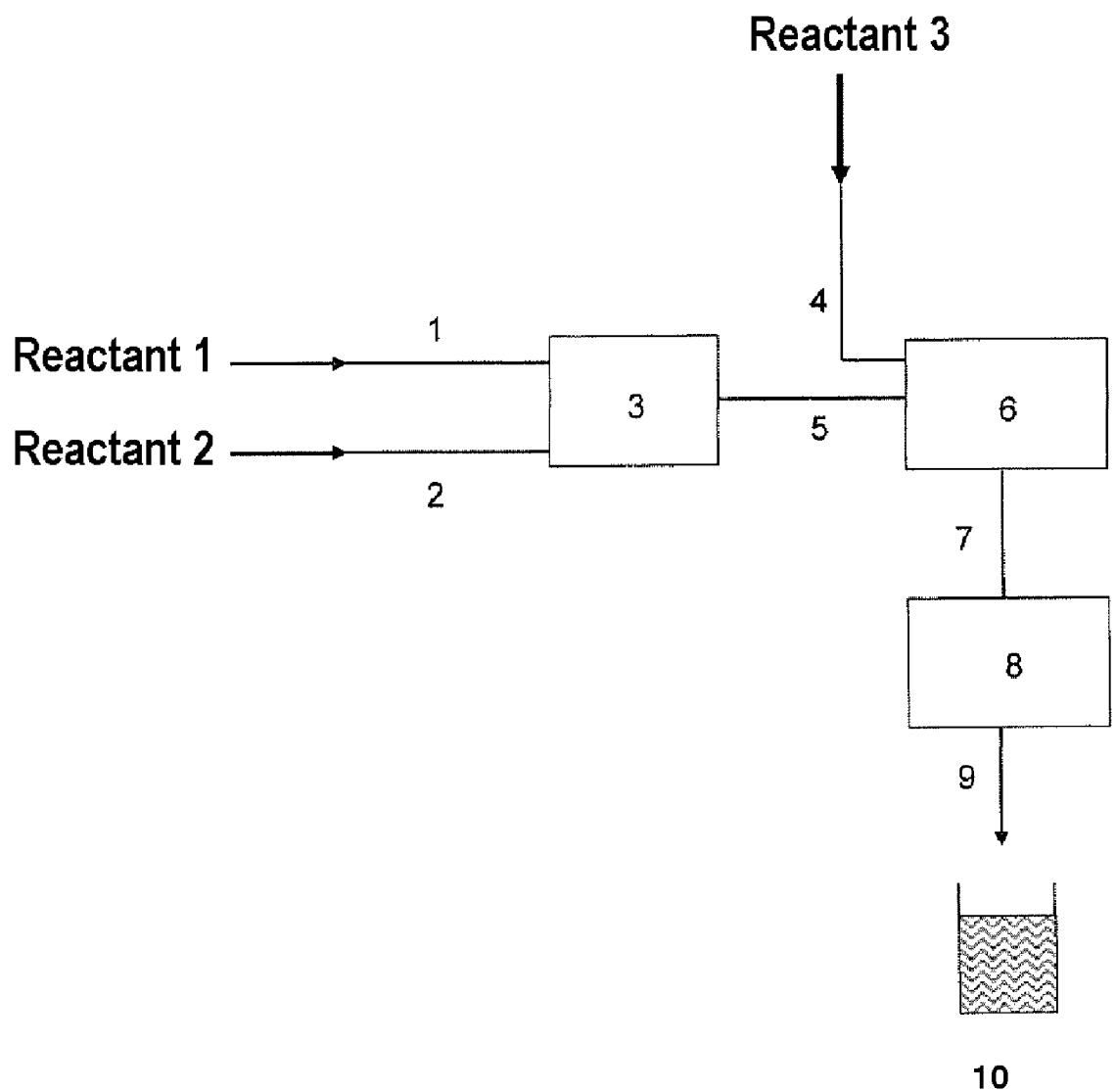
FIG. 2 is a schematic representation of apparatus for performing a continuous variant of the process of the invention.

Ag particles were produced continuously by the process shown schematically in FIG. 2.

FIG. 2 shows a schematic illustration of the apparatus for performing the continuous variant of the process, without being limited thereto.

REFERENCE NUMERALS FOR FIG. 2

1. Delay zone
2. Delay zone
3. Mixer (silver oxide precipitation)
4. Delay zone
5. Delay zone
6. Mixer (reduction of silver oxide to silver)
7. Delay zone
8. Pressure valve
9. Exit capillary
10. Product vessel The feed capillaries, i.e. delay zones (1) and (2), to the mixer (3) and the feed capillaries, i.e. delay zones (4) and (5), to the mixer (6), the delay zone (7), consist of capillary tubes having an internal diameter of 2.25 mm. Delay zones (1), (2), (4) and (5) each have a length of 30 cm. The mixer used both in the precipitation and the reduction stage was a multilamellar mixer (comb mixer, Ehrfeld Mikrotechnik BTS GmbH). The temperatures of the delay zones (1, 2, 4, 5 and 7) and of the mixers (3) and (6) were controlled by immersion of (3) and (6) into a water bath at 10° C.

A 54 millimolar solution of silver nitrate (9.17 g/l of AgNO$_3$) as reactant 1 and a 54 millimolar solution of NaOH (2.14 g/l) with a dispersing assistant concentration of 10 g/l as reactant 2 were made up. Reactant 3 consisted of a 1350 millimolar solution of formaldehyde (40.5 g/l). The solvent used was demineralized water (prepared with Milli-Qplus, QPAK®2, Millipore Corporation). The dispersing assistant used was PVP K15 polyvinylpyrrolidone (Fluka Chemie GmbH).

High-pressure HPLC pumps with pressure sensors (Shimadzu LC-7 A) were used to pump both reactants from reactant vessels at room temperature through the system with a constant flow rate of in each case 3 ml/min. The pressure in the system was adjusted to 20 bar by regulating the pressure valve (R3A relief valve, Nupro Company).

This afforded a brown Ag nanosol which was stable in terms of colloid chemistry and had no significant sedimentation.

The invention claimed is:

1. Process for producing silver metal particle sols having a metal particle content of $\geq 1$ g/l, comprising the steps of
   a) reacting a silver metal salt solution having a silver metal salt concentration of $\geq 0.1$ to $\leq 0.5$ mol/l with a solution containing hydroxide ions at a concentration of $\geq 0.1$ to $\leq 0.5$ mol/l, thereby forming silver metal oxides or hydrates thereof, silver metal hydroxides or hydrates thereof, mixed silver metal oxide hydroxides or hydrates thereof, or any combination thereof,
   b) reacting the solution obtained from step a) with a reducing agent,
   wherein at least one of the solutions in step a) comprises a dispersing assistant and whereby both steps a) and b) are performed continuously in a microreactor.

2. Process according to claim 1, wherein the dispersing assistant is selected from the group consisting of alkoxylates, alkylolamides, esters, amine oxides, alkylpolyglucosides, alkylphenols, arylalkylphenols, water-soluble homopolymers, random copolymers, block copolymers, graft polymers, polyethylene oxides, polyvinyl alcohols, copolymers of polyvinyl alcohols and polyvinyl acetates, polyvinylpyrrolidones, cellulose, starch, amino acid polymers, polylysine, polyaspartic acid, polyacrylates, polyethylenesulphonates, polystyrenesulphonates, polymethacrylates, condensation products of aromatic sulphonic acids with formaldehyde, naphthalenesulphonates, lignosulphonates, copolymers of acrylic monomers, polyethyleneimines, polyvinylamines, polyallylamines, poly(2-vinylpyridines) and polydiallyldimethylammonium chloride.

3. Process according to claim 1, wherein the dispersing assistant is present in at least one reactant solution in a concentration of $\geq 0.1$ g/l to $\leq 100$ g/l.

4. Process according to claim 1, wherein the solution comprising hydroxide ions is obtained from the reaction of bases selected from the group consisting of LiOH, NaOH, KOH, $Mg(OH)_2$, $Ca(OH)_2$, aliphatic amines, aromatic amines, alkali metal amides and alkoxides.

5. Process according to claim 1, wherein the reducing agent is selected from the group consisting of polyalcohols, aminophenols, amino alcohols, aldehydes, sugars, tartaric acid, citric acid, ascorbic acid and salts thereof, triethanolamine, hydroquinone, sodium dithionite, hydroxymethanesulphinic acid, sodium disulphite, formamidinesulphinic acid, sulphurous acid, hydrazine, hydroxylamine, ethylenediamine, tetramethylethylenediamine, hydroxylamine sulphate, sodium borohydride, formaldehyde, alcohols, ethanol, n-propanol, iso-propanol, n-butanol, iso-butanol, sec-butanol, ethylene glycol, ethylene glycol diacetate, glycerol and dimethylaminoethanol.

6. Metal particles produced by the process according to claim 1.

7. Metal particles according to claim 6, having a particle size $d_{50}$ value of $\geq 0.01$ µm to $\leq 0.5$ µm.

8. A method for producing catalysts, coating materials, functional layers, transparent conductive layers, metallurgic products, electronic products, electroceramics, optical materials, biolabels, inks for inkjet printing and screen printing, conductive microstructures, materials for forgeryproof marking, polymer composites, antimicrobial materials and/or active ingredient formulations which comprises producing same from the metal particles of claim 7.

* * * * *